United States Patent
Lindsay et al.

(10) Patent No.: US 10,534,821 B2
(45) Date of Patent: *Jan. 14, 2020

(54) ACQUIRING STRUCTURED USER DATA USING COMPOSER INTERFACE HAVING INPUT FIELDS CORRESPONDING TO ACQUIRED STRUCTURED DATA

(71) Applicant: Facebook, Inc., Menlo Park, CA (US)

(72) Inventors: Robert Taaffe Lindsay, San Francisco, CA (US); Samuel Lessin, San Francisco, CA (US); Justin Alexander Shaffer, San Francisco, CA (US); Nicholas Felton, Brooklyn, NY (US); Ryan Case, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 439 days.

This patent is subject to a terminal disclaimer.

(21) Appl. No.: 15/210,015

(22) Filed: Jul. 14, 2016

(65) Prior Publication Data

US 2016/0321370 A1 Nov. 3, 2016

Related U.S. Application Data

(63) Continuation of application No. 13/544,860, filed on Jul. 9, 2012, now Pat. No. 9,436,687.

(51) Int. Cl.
*G06Q 30/02* (2012.01)
*G06F 16/9535* (2019.01)
(Continued)

(52) U.S. Cl.
CPC ........ *G06F 16/9535* (2019.01); *G06F 3/0482* (2013.01); *G06F 16/24578* (2019.01);
(Continued)

(58) Field of Classification Search
None
See application file for complete search history.

(56) References Cited

U.S. PATENT DOCUMENTS 8,060,533 B1 * 11/2011 Wheeler ............... H04M 15/55
707/791
8,346,799 B1 * 1/2013 Huet ..................... G06F 16/951
707/770
(Continued)

FOREIGN PATENT DOCUMENTS

JP 2008-545200 A 12/2008
KR 10-2008-0043764 A 5/2008
(Continued)

OTHER PUBLICATIONS

Shehab et al., User Centric Policy Management in Online Social Networks, 2010 IEEE International Symposium on Policies for Distributed Systems and Networks, IEEE computer society.*
(Continued)

*Primary Examiner* — David J Stoltenberg
(74) *Attorney, Agent, or Firm* — Fenwick & West LLP

(57) ABSTRACT

A social networking system obtains specific structured data about a user via a composer interface having textual content with incomplete portions and input fields corresponding to the incomplete portions. The input fields map to data fields in the user's profile and are selected based on the social networking system's need for the information associated with the data fields.

16 Claims, 5 Drawing Sheets

(51) Int. Cl.
| | |
|---|---|
| *H04L 29/08* | (2006.01) |
| *G06F 16/335* | (2019.01) |
| *G06F 16/435* | (2019.01) |
| *G06F 16/901* | (2019.01) |
| *G06F 16/2457* | (2019.01) |
| *G06Q 50/00* | (2012.01) |
| *G06F 3/0482* | (2013.01) |
| *G06F 9/445* | (2018.01) |

(52) U.S. Cl.
CPC ......... *G06F 16/335* (2019.01); *G06F 16/337* (2019.01); *G06F 16/437* (2019.01); *G06F 16/9024* (2019.01); *G06Q 50/01* (2013.01); *H04L 67/22* (2013.01); *H04L 67/306* (2013.01); *G06F 9/44505* (2013.01); *G06Q 30/0241* (2013.01)

(56) References Cited

U.S. PATENT DOCUMENTS

| | | | | |
|---|---|---|---|---|
| 8,949,725 | B1* | 2/2015 | Goncharuk | G06Q 10/107 715/758 |
| 9,026,592 | B1* | 5/2015 | Marra | H04L 29/06414 709/204 |
| 9,544,538 | B2* | 1/2017 | Cahill | H04N 7/15 |
| 2004/0002995 | A1* | 1/2004 | Martino | H04N 7/163 |
| 2005/0144193 | A1* | 6/2005 | Henzinger | G06F 16/951 |
| 2006/0224608 | A1* | 10/2006 | Zamir | G06F 17/30864 |
| 2006/0224615 | A1* | 10/2006 | Korn | G06F 17/30867 |
| 2006/0224938 | A1* | 10/2006 | Fikes | G06F 17/30876 715/234 |
| 2006/0294084 | A1* | 12/2006 | Patel | G06Q 30/02 |
| 2007/0094254 | A1* | 4/2007 | Cutts | G06Q 30/0246 |
| 2007/0094255 | A1* | 4/2007 | Acharya | G06Q 30/0246 |
| 2007/0100817 | A1* | 5/2007 | Acharya | G06Q 30/0246 |
| 2009/0049036 | A1* | 2/2009 | Juan | G06Q 10/10 |
| 2009/0063379 | A1* | 3/2009 | Kelly | G06Q 10/00 706/46 |
| 2010/0057857 | A1* | 3/2010 | Szeto | H04L 51/04 709/206 |
| 2010/0114836 | A1* | 5/2010 | Chan | G06F 17/30 707/662 |
| 2010/0114887 | A1* | 5/2010 | Conway | G06F 3/0237 707/737 |
| 2010/0325114 | A1* | 12/2010 | Henzinger | G06F 16/951 707/748 |
| 2010/0332513 | A1* | 12/2010 | Azar | G06F 16/24545 707/769 |
| 2011/0010423 | A1* | 1/2011 | Thatcher | G06Q 10/107 709/206 |
| 2011/0022602 | A1* | 1/2011 | Luo | G06Q 10/10 707/748 |
| 2011/0029620 | A1* | 2/2011 | Bonforte | H04L 67/306 709/206 |
| 2011/0041082 | A1* | 2/2011 | Nguyen | G06Q 10/10 715/752 |
| 2011/0125550 | A1* | 5/2011 | Erhart | G06Q 30/0201 705/7.29 |
| 2011/0125783 | A1* | 5/2011 | Whale | G06F 17/30011 707/769 |
| 2011/0153412 | A1* | 6/2011 | Novikov | G06Q 30/02 705/14.42 |
| 2011/0191717 | A1* | 8/2011 | Cort | G06F 3/048 715/816 |
| 2011/0238762 | A1* | 9/2011 | Soni | G01C 21/3679 709/206 |
| 2012/0054681 | A1* | 3/2012 | Cort | G06F 3/048 715/816 |
| 2012/0060106 | A1* | 3/2012 | Moxley | G06Q 10/10 715/758 |
| 2012/0089690 | A1* | 4/2012 | Hein | G06Q 10/10 709/206 |
| 2012/0110088 | A1* | 5/2012 | Su | H04W 4/21 709/205 |
| 2012/0151605 | A1* | 6/2012 | Shah | G06F 17/30569 726/28 |
| 2012/0166999 | A1* | 6/2012 | Thatcher | G06Q 10/107 715/780 |
| 2012/0323928 | A1* | 12/2012 | Bhatia | G06F 17/30528 707/748 |
| 2013/0111354 | A1* | 5/2013 | Marra | G06Q 50/01 715/751 |
| 2013/0227030 | A1* | 8/2013 | Eidelson | H04L 67/1095 709/206 |
| 2014/0012905 | A1* | 1/2014 | Roche | H04L 51/36 709/204 |
| 2014/0012927 | A1* | 1/2014 | Gertzfield | G06Q 50/01 709/206 |
| 2014/0019882 | A1* | 1/2014 | Chew | G06Q 10/10 715/753 |
| 2015/0169574 | A1* | 6/2015 | Bau | G06F 16/5866 707/725 |
| 2015/0317714 | A1* | 11/2015 | Huet | G06F 16/951 705/26.62 |

FOREIGN PATENT DOCUMENTS

| | | |
|---|---|---|
| KR | 10-2009-0124823 A | 12/2009 |
| TW | 200937332 A | 9/2009 |

OTHER PUBLICATIONS

Korea Intellectual Property Office, Office Action, Korean Patent Application No. 10-2015-7000692, dated Aug. 21, 2017, fifteen pages.
Canadian Intellectual Property Office, Office Action, Canadian Patent Application No. 2,875,716, dated Feb. 24, 2017, three pages.
Japan Patent Office, Office Action, Japanese Patent Application No. 2015-521642, dated Mar. 7, 2017, seven pages.

\* cited by examiner

US 10,534,821 B2

ACQUIRING STRUCTURED USER DATA USING COMPOSER INTERFACE HAVING INPUT FIELDS CORRESPONDING TO ACQUIRED STRUCTURED DATA

CROSS-REFERENCE TO RELATED CASES

This application is a continuation of U.S. patent application Ser. No. 13/544,860, filed on Jul. 9, 2012, which is hereby incorporated by reference.

BACKGROUND

This invention relates generally to social networking, and in particular to acquiring structured data about users of a social networking system using a composer interface with input fields for receiving the structured data about a user.

Social networking systems aggregate information about users and their relationships to provide a more personalized user experience. Information about the users is often self-reported (e.g., information about the user's interests, activities, and the nature of their relationships with other users). Additional information about users and their relationships with other users also may be collected by the social networking service, such as the number, frequency, and directionality of interactions between users and the various types of interactions which may occur between users, just to name a few. Information about users, their relationships, and interests is valuable, both to users of social networking services (including advertisers who may wish to market products using certain viral marketing campaigns that utilize this information) and to administrators of the social networking service wishing to develop a more personalized experience for their users. Even though a social networking system may collect, and in some cases infer, information about its users, the social networking system may require certain information about its users in order to better understand its users. Conventional systems lack a mechanism for acquiring data from a user via a composer interface that includes input fields chosen based on the systems' data needs.

SUMMARY

A social networking system obtains specific structured data about a user via a composer interface having textual content with incomplete portions and input fields corresponding to the incomplete portions. The input fields map to data fields in the user's profile and are selected based on the social networking system's need for the information associated with the data fields.

In one embodiment, to determine what information to acquire from a user, the system analyzes the user's profile and determines a score for each data field in the user's profile. The score for a data field may be based on the value to the social networking system of having information for the data field. The value of a data field may be based on projected revenue generated from using the information, projected increase in user engagement from using the information, the cost of displacing other content, the value of other information that may be determined as a result of obtaining the information associated with the data field, or any combination thereof. In some embodiments, the score for a data filed is based in part on the probability of getting a response from the user. The probability of getting a response from the user may be based on the user's historical response rate, the historical response rate of the user's connections, or a combination thereof. A data field is selected based on its score and an incomplete phrase designed to collect information associated with the data field is selected. For example, the phrase, "I _____ eating at _____, the service is generally _____ and the food is usually _____," may be selected to collect information for a data field that stores information about the user's dining activity or preferences. A composer interface having the incomplete phrase and input fields corresponding to the incomplete portions of the phrase is sent to the user. In some embodiments, one or more of the input fields may only accept certain categories of words. For example, a particular input field may accept only a noun, verb, adverb, or adjective. In some embodiments, one or more of the input fields may only accept certain categories of information such as names of people, places, things, or concepts. The user completes the incomplete phrase by providing input to the input fields. By completing the phrase the user provides information to the social networking system that is related to the selected data field. Information based on the user's input to the composer interface is stored in the user's profile and associated with the selected data field.

Figure 1:
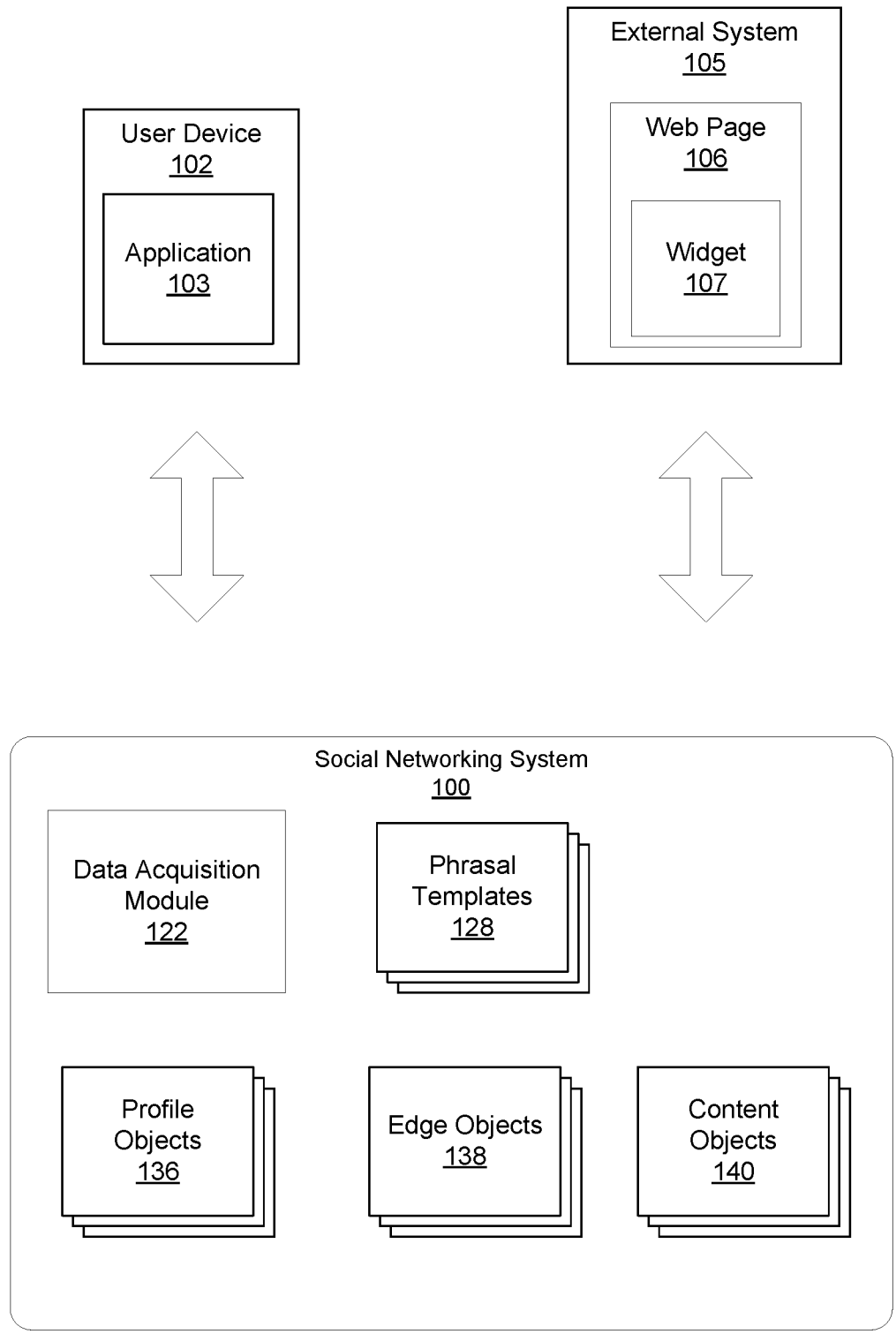
FIG. 1 is a high level block diagram illustrating a process for acquiring structured user data via a composer interface having textual content with incomplete portions and input fields corresponding to the incomplete portions, in accordance with some embodiments.

The figures depict various embodiments of the described methods and system and are for purposes of illustration only. One skilled in the art will readily recognize from the following discussion that alternative embodiments of the methods and systems illustrated herein may be employed without departing from the principles of the methods and systems described herein.

DETAILED DESCRIPTION

Overview

A social networking system offers its users the ability to communicate and interact with other users of the social networking system. Users join the social networking system and add connections to a number of other users to whom they desire to be connected. Users of social networking system can provide information describing them which is stored as user profiles. For example, users can provide their age, gender, geographical location, education history, employment history and the like. The information provided by users may be used by the social networking system to direct information to the user. For example, the social networking system may recommend social groups, events, and potential friends to a user. A social networking system may also enable users to explicitly express interest in a concept, such as celebrities, hobbies, sports teams, books, music, and the like. These interests may be used in a myriad of ways, including targeting advertisements and personalizing the user experience on the social networking system by showing relevant stories about other users of the social networking system based on shared interests.

A social graph includes nodes connected by edges that are stored on a social networking system. Nodes include users and objects of the social networking system, such as web pages embodying concepts and entities, and edges connect the nodes. Edges represent a particular interaction between two nodes, such as when a user expresses an interest in a news article shared by another user about "America's Cup." The social graph may record interactions between users of the social networking system as well as interactions between users and objects of the social networking system by storing information in the nodes and edges that represent these interactions. Custom graph object types and graph action types may be defined by third-party developers as well as administrators of the social networking system to define attributes of the graph objects and graph actions. For example, a graph object for a movie may have several defined object properties, such as a title, actors, directors, producers, year, and the like. A graph action type, such as "purchase," may be used by a third-party developer on a website external to the social networking system to report custom actions performed by users of the social networking system. In this way, the social graph may be "open," enabling third-party developers to create and use the custom graph objects and actions on external websites.

Third-party developers may enable users of the social networking system to express interest in web pages hosted on websites external to the social networking system. These web pages may be represented as page objects in the social networking system as a result of embedding a widget, a social plug-in, programmable logic or code snippet into the web pages, such as an iFrame. Any concept that can be embodied in a web page may become a node in the social graph on the social networking system in this manner. As a result, users may interact with many objects external to the social networking system that are relevant to a keyword or keyword phrase, such as "Justin Bieber." Each of the interactions with an object may be recorded by the social networking system as an edge object. Enabling third-party developers to define custom object types and custom action types is described further in "Structured Objects and Actions on a Social Networking System," U.S. application Ser. No. 13/239,340 filed on Sep. 21, 2011, which is hereby incorporated by reference.

Even though a social networking system may collect, and in some cases infer, information about its users, the social networking system may want certain information about its users in order to better understand the users. Using this information, the social networking system may provide a user with a more personalized experience. The social networking system determines information to acquire from a user that would optimize a goal of the system and generates a composer interface for acquiring the determined information. The composer interface prompts the user to complete one or more phrases that are designed to obtain information about the user.

FIG. 1 is a high level block diagram of a process for a social networking system to acquire structured user data via a composer interface having textual content with incomplete portions and input fields corresponding to the incomplete portions, in accordance with one embodiment. The data acquisition module 122 of the social networking system 100 determines missing or outdated information about a user that can be used to optimize a goal of the social networking system 100 and generates a composer interface configured to obtain the determined information. The composer interface includes one or more phrases having incomplete portions and input fields corresponding to the incomplete portions. For example, the composer interface may include the text, "I ran miles this week," and an input field between the words "ran" and "miles" for receiving a number. The phrase is from a phrasal template 128 and chosen based on the social networking systems needs for the information that the phrase is designed to collect. In order to determine what information to acquire from the user, the data acquisition module 122 analyzes the user's profile information which includes profile objects 136, edge objects 138, and content objects 140.

A user device 102 comprises one or more computing devices that can receive input from a user and can transmit and receive data via a network. The user device 110 can execute an application 103, for example, a browser application that allows a user of the user device 102 to interact with the social networking system 100.

The external system 105 includes a webpage 106 with a widget 107 that includes instructions for communicating with the social networking system 100 and/or the user device 102. The widget 107 may include instructions that cause a user device to obtain a composer interface from the social networking system 100 and include the composer interface in a webpage 106 that is sent to a user.

Using the above methods, a social networking system may obtain missing or updated information about a user. For example, a social networking system may learn more about a user's activities, hobbies, education history, and work history. A social networking system may also confirm recent changes to a user's personal life that have been inferred by the social networking system, such as an engagement, birth of a child, moving across the country, graduating from college, and starting a new job, can be collected and inferred. Using this information, a social networking system may create a more personalized experience for the user. For example, a social networking system may present statistics about a user's activities, select new stories for the user's newsfeed that better match the user's interests and activities, or select better targeted advertising.

System Environment

Figure 2:
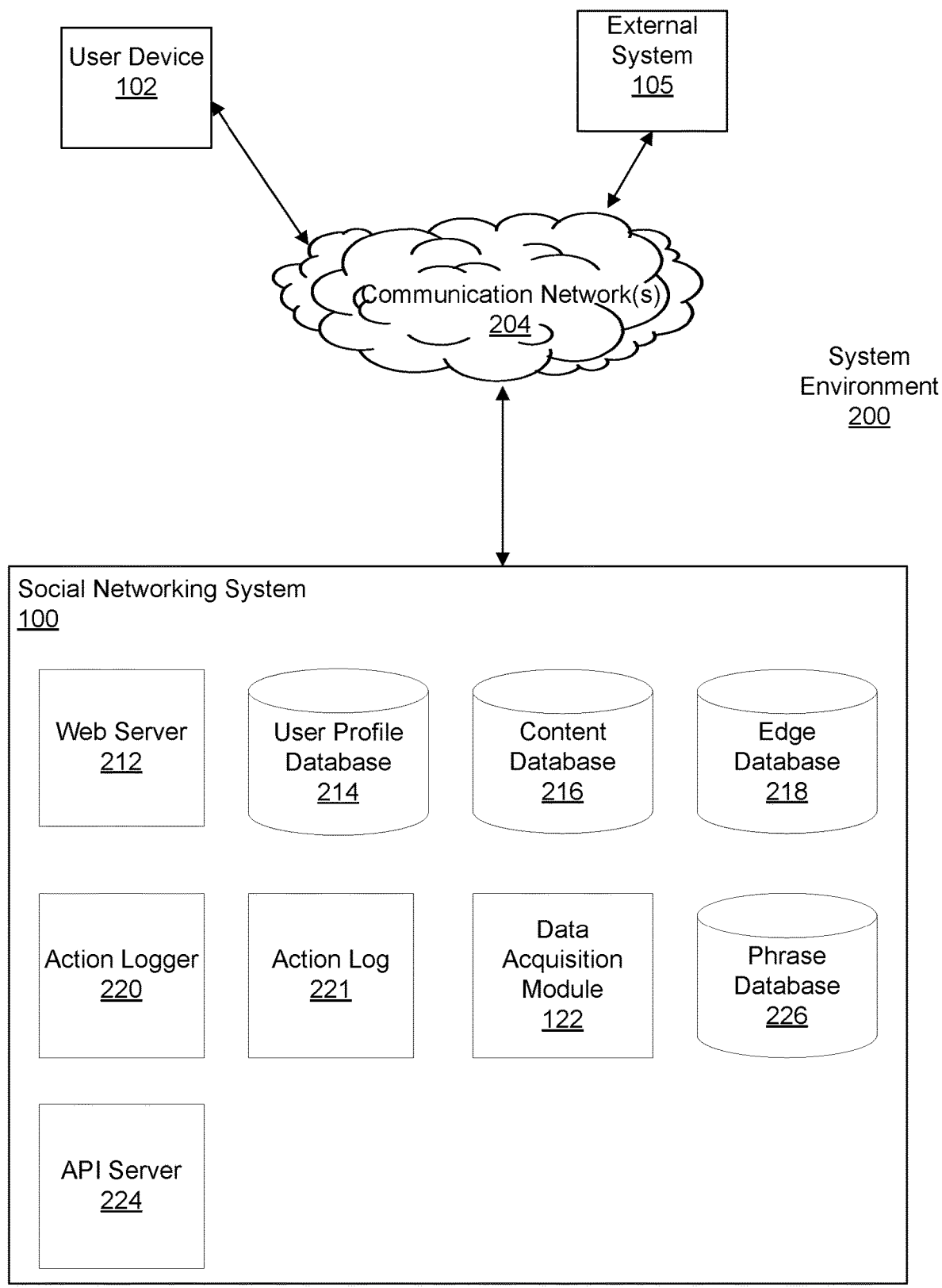
FIG. 2 is a high level block diagram illustrating a system environment, in accordance with some embodiments.

FIG. 2 is a high level block diagram illustrating a system environment 200, in accordance with one embodiment. The system environment 200 comprises one or more user devices 102, one or more external systems 105, the social networking system 100, and a network 204. In alternative configurations, different and/or additional modules can be included in the system. In some embodiments, the social networking system 100 is implemented as a single server, while in other embodiments it is implemented as a distributed system of multiple servers. For convenience of explanation, the social networking system 100 is described below as being implemented on a single server system. For purposes of illustration, the embodiment of the system 100 shown by FIG. 1 includes a single external system 105 and a single user device 102. However, in other embodiments, the environment 200 may include more user devices 102 and/or more external systems 105. In certain embodiments, the social networking system 100 is operated by the social network provider, whereas the external systems 105 are separate from the social networking system 100 in that they may be operated by different entities. In various embodiments, however, the social networking system 100 and the external systems 105 operate in conjunction to provide social networking services to users of the social networking system 100. In this sense, the social networking system 100 provides a platform, or backbone, which other systems, such as external systems 100, may use to provide social networking services and functionalities to users across the Internet.

The communication network(s) 204 can be any wired or wireless local area network (LAN) and/or wide area network (WAN), such as an intranet, an extranet, or the Internet. It is sufficient that the communication network 204 provides communication capability between the user devices 102 and the social networking system 100. In some embodiments, the communication network 204 uses the HyperText Transport Protocol (HTTP) and the Transmission Control Protocol/Internet Protocol (TCP/IP) to transmit information between devices or systems. HTTP permits the user devices 102 to access various resources available via the communication network 204. The various embodiments of the invention, however, are not limited to the use of any particular protocol.

The user devices 102 comprise one or more computing devices that can receive user input and can transmit and receive data via the network 204. In one embodiment, the user device 102 is a conventional computer system executing, for example, a Microsoft Windows-compatible operating system (OS), Apple OS X, and/or a Linux distribution. In another embodiment, the user device 102 can be a device having computer functionality, such as a personal digital assistant (PDA), mobile telephone, smart-phone, etc. The user device 102 is configured to communicate via network 204. The user device 102 can execute an application, for example, a browser application that allows a user of the user device 102 to interact with the social networking system 100. In another embodiment, the user device 102 interacts with the social networking system 100 through an application programming interface (API) that runs on the native operating system of the user device 102, such as iOS and ANDROID.

The external system 105 includes one or more web servers including one or more web pages, which are communicated to the user device 102 using the network 204. The external system 105 is separate from the social networking system 100. For example, the external system 105 is associated with a first domain while the social networking website is associated with a separate social networking domain. Web pages included in the external system 105 comprise markup language documents identifying content and including instructions specifying formatting or presentation of the identified content. In some embodiments, the web pages include a widget that provides instructions to request a composer interface from the social networking system. For example, if the user clicks on a link to play a song on the external system 105, the widget provides instructions to a browser application on the user device that is rendering the webpage to send a request to the social networking system for a composer interface for the user. The request may include an identifier for the user.

The web server 212 links the social networking system 100 via the network 204 to one or more user devices 102; the web server 212 serves web pages, as well as other web-related content, such as JAVA®, FLASH®, XML, and so forth. The web server 212 may provide the functionality of receiving and routing messages between the social networking system 100 and the user devices 102, for example, instant messages, queued messages (e.g., email), text and SMS (short message service) messages, or messages sent using any other suitable messaging technique. The user can send a request to the web server 212 to upload information, for example, images or videos that are stored in the content database 216. Additionally, the web server 212 may provide API functionality to send data directly to native user device operating systems, such as IOS®, ANDROID™, WEBOS®, and BlackBerry OS.

The action logger 220 is capable of receiving communications from the web server 212 about user actions on and/or off the social networking system 100. The action logger 220 populates an action log with information about user actions that users have given informed consent to collect. Such actions may include, for example, adding a connection to the other user, sending a message to the other user, uploading an image, reading a message from the other user, viewing content associated with the other user, attending an event posted by another user, among others. In addition, a number of actions described in connection with other objects are directed at particular users, so these actions are associated with those users as well.

An action log 221 may be used by a social networking system 100 to track users' actions on the social networking system 100 as well as external websites that communicate information back to the social networking system 100. As mentioned above, users may interact with various objects on the social networking system 100, including commenting on posts, sharing links, and checking-in to physical locations via a mobile device. The action log may also include user actions on external websites. For example, an e-commerce website that primarily sells luxury shoes at bargain prices may recognize a user of a social networking system 100 through social plug-ins that enable the e-commerce website to identify the user of the social networking system. Because users of the social networking system 100 are uniquely identifiable, e-commerce websites, such as this luxury shoe reseller, may use the information about these users as they visit their websites. The action log records data about these users, including viewing histories, advertisements that were clicked on, purchasing activity, and buying patterns.

The Application Programming Interface (API) server 224 allows one or more user devices 102 to access information from the social networking system 100 by calling one or more APIs. The API server 224 may also allow user devices 102 to send information to social networking system 100 by calling APIs. A user device 102, in one embodiment sends an API request to the social networking system 100 via the network 204 and the API server 224 receives the API request. The API server 224 processes the request by calling an API associated with the API request to generate an appropriate response, which the API server 224 communicates to the user device 102 via the network 204. For example, responsive to an API request, the API server 200 collects data associated with a user, such as the user's connections, and communicates the collected data to the user device 102. In another embodiment, an external system that hosts web pages communicates with the social networking system 100 via APIs in the same manner as external systems 105. In some embodiments, the API server 224 includes functions to enable a third party application to enter user data into input fields of a composer interface.

The user profile database 214 stores user profile objects. User profile objects include declarative profile information about a user, inferred or implicit information about a user from the user's actions on the social networking system 100 and outside of the social networking system, information about the user's activities and interests, and information about the user's friends or connections in the social networking system. A user's profile information stored in a profile object includes biographic, demographic, and other types of descriptive information, such as work experience, educational history, gender, hobbies or preferences, location, and the like. A user's profile object includes various data fields for storing information items about a user. Each data field may store a different type of information about a user. Examples of the information stored by the data fields include phone numbers, instant message screen names, addresses, websites, current city, hometown, gender, birthday, names of family members, languages spoke, a description, education history, work history, religious affiliations, political views, favorite quotes, favorite sports, favorite foods, favorite books, favorites movies, interests, activities, names of pets, information about friends, and the like.

A profile object for a user may also include the user's affinity scores for objects in the social networking system 100. An affinity score measures or indicates a user's affinity for one an object in the social networking system 100. In one embodiment, affinity scores of users for an object may be determined by the social networking system 100 based on the user's interactions with the specified object over time. In particular, affinity scores of the users for an object may be determined based on edge objects containing information describing the interactions between the user and object. Example embodiments of computing affinity scores are described in a related application, "Contextually Relevant Affinity Prediction in a Social Networking System," U.S. patent application Ser. No. 12/978,265, filed on Dec. 23, 2010, which is hereby incorporated by reference. The user profile may also store other information provided by the user, for example, images or videos. In certain embodiments, images of users may be tagged with identification information of users of the social networking system 100 displayed in an image. The user profile database 214 also maintains references to the actions stored in an action log and performed on objects in the content database 216.

The edge database 218 stores edge objects. Edge objects connect objects in the social graph and include information about the viewing user's interactions with other objects on the social networking system 100, such as clicking on a link shared with the viewing user, sharing photos with other users of the social networking system, posting a status update message on the social networking system 100, and other actions that may be performed on and off the social networking system 100. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 100, such as expressing interest in a page on the social networking system, sharing a link with other users of the social networking system, and commenting on posts made by other users of the social networking system. The edge database 218 stores edge objects that include information about the edge, such as affinity scores for objects, interests, and other users. Affinity scores may be computed by the social networking system 100 over time to approximate a user's affinity for an object, interest, and other users in the social networking system 100 based on the actions performed by the user. Multiple interactions between a user and a specific object may be stored in one edge object in the edge database 218, in one embodiment. For example, a user that plays multiple songs from Lady Gaga's album, "Born This Way," may have multiple edge objects for the songs, but only one edge object for Lady Gaga. Edge objects may also include information about user interactions outside of the social networking system 100. For example, interaction information may be collected from third-party systems (e.g., sites and applications) that use social plug-ins that enables users to interact with social content from the social networking system 100.

The content database 216 stores content objects. A content object may include any type of object on the social networking system 100, such as a page post, a status update, a photo, a video, a link, a shared content item, a gaming application achievement, a check-in event at a local business, and so on. Content objects include objects created by users of the social networking system 100, such as status updates that may be associated with photo objects, location objects, and other users, photos tagged by users to be associated with other objects in the social networking system 100, such as events, pages, and other users, and applications installed on the social networking system 100. In some embodiments, the content objects are received from third-party applications or third-party applications separate from the social networking system 100.

The phrase database 226 stores incomplete phrases or phrasal templates. An incomplete phrase or phrasal template includes a sequence of text that includes one or more empty or missing portions that may be filled by words or numbers to produce an individual phrase. In some embodiments, input restriction information is stored with an incomplete phrase that specifies input restrictions for the incomplete portions in the incomplete phrase. The input restriction information for an input field specifies what types of information an input field may accept as valid input. In some embodiments, an incomplete phrase is associated with one or more user profile data fields. For example, the phrase, "My favorite actor from the movie _____ is _____," may be associated with a data field that stores information about a user's movie preferences and a data field that stores information about the user's favorite actors or public figures.

Composer Interface for Receiving Structured Data

Figure 3:
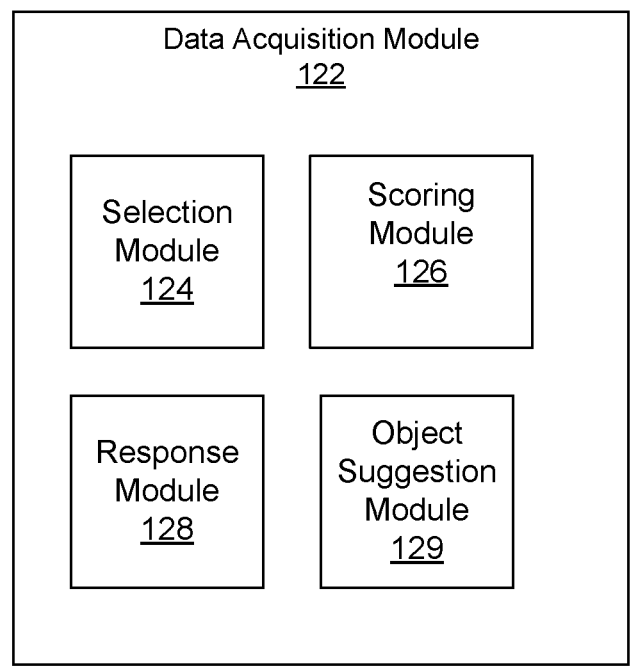
FIG. 3 is a high level block diagram illustrating a data acquisition module that includes various modules for selecting input fields to include in a composer interface, in accordance with some embodiments.

FIG. 3 illustrates a high level block diagram of the data acquisition module 122 in further detail, in one embodiment. The data acquisition module 122 module includes a text selection module 124, a scoring module 126, a object suggestion module 129, and a response module 128. These modules may perform in conjunction with other modules to generate a composer interface that includes a phrase having an incomplete portion and an input field corresponding to the incomplete portion. These modules may perform in conjunction to determine what information from a user to collect, when to collection the information, how to collect the information, and where the information is collected.

The scoring module 126 determines what information to collect from a user. More specifically, the scoring module 126 determines a score or metric for the data fields associated with a user's profile and selects one or more of the data fields based on the determined scores. A score for a data field measures the social networking systems need for the type of information associated with the data field. For example, when the system selects a data field for storing a user's telephone number, the system has a need for the user's telephone number.

To determine what information about the user to acquire, the scoring module 126 analyzes the information stored by the social networking system for the user. The user's information comprises profile objects, edge objects, and content objects from the user profile object database 214, content object database 216, and edge object database. In particular, the scoring module 126 identifies the data fields and information stored by the data fields in the user's profile. The information for the user may include a user's declarative profile information, which is information provided to the social networking by the user. The stored information for the user may include information that the social networking system inferred about the user. For example, the social networking system may infer a user's interests in a music artist based on the user's activities on or off the social networking system, such as playing songs by the artist or discussing the artist. The information for the user may include information about the user's activities on the social networking and/or on external systems operated by third parties. For example, information describing actions of the user on a third party website may be sent to the social networking system and stored in an edge object. The information for the user may include information about a user's connections. For example, the information may describe events a user's connection went to or where their friends went to school. In some embodiments, information associated with a data field includes a timestamp of when the information was obtained or created. In some embodiments, the information associated with a data field is associated with one or more geographic locations. The locations may include a location of where the information was acquired from or the locations of one or more users associated with the information.

In some embodiments, the scoring module 126 identifies data fields in the user's profile that are not associated with any information or are out of date. Stated in another way, the scoring module 126 analyzes a user's profile to identify missing information or out of date information. The information associated with a data field may be out of date when it has not been updated for a predefined amount of time. In some embodiments, one or more of the data fields include a time limit that indicates when a data field should be updated. The time limit for a data field may depend on the type of the information stored by the data field. For example, a user's hobbies may have a shorter time limit than the user's hometown since the user is more likely to change their hobbies. In some embodiments, the information stored in a data field is given a freshness score that is decayed over time by a decay rate. The decay rate for a data field may depend on the type of information stored by the data field.

The scoring module 126 determines a data acquisition score for each data field in a set of data fields. In some embodiments, the set of data fields corresponds to a set of data fields identified as out of date or as having missing information. A data acquisition score measures the social networking systems need for the type of information stored by a data field. In some embodiments, the scoring module 126 stores the data acquisition score for a respective data field as a value pair. The value pair includes information identifying a data field and its corresponding data acquisition score. The scoring module 126 may store a set of value pairs for a user or include the value pairs with the user's profile.

In some embodiments, a data acquisition score for a data field is determined at least in part on the value to the social networking system of the type of information associated with the data field. As used herein, the value of a data field is the value of the type of information stored by the data field. In some embodiments, the scoring module 126 stores a table with values for each data field. In some embodiments, the value of the information associated with a data field corresponds to a goal of the social networking site including a projected growth generated by using the information, projected revenue generated from using the information, projected increase in user engagement generated from using the information, and the projected increase to a user's social score using the information, or any combination thereof. In some embodiments, a social score measures a user's social influence. The user's social score may be based on the number of connections the user has, the number of followers the user has, the average number of users who comment on the user's posts, or any combination thereof. The value of the information associated with a data field may be based in part on the cost associated with displacing other content in order to obtain the information for the data field. For example, in order to obtain the information, the system may display a composer interface which may displace social content or advertisements. The value of the information associated with a data field may be based in part on the likelihood that receiving the information for the data field will lead to additional information. For example, a user's favorite movies may reveal the categories of movies the user is most interested in or the actors or actresses the user is a fan of. The value of a data field may be based in part on the value of the information in newsfeed stories or in sponsored stories. A sponsored story comprises an advertising message that communicates a message about at least one user action.

In some embodiments, the data acquisition score for a data field is based in part on the probability that the user will provide input to a composer interface. Stated in another way, the data acquisition score for a data field may be based in part on the probability of getting a response from the user. In some embodiments, the scoring module 126 stores a table with response probabilities for each data field or a single response probability for the user. In some embodiments, the scoring module 126 determines the probability of the user will supply the information associated with a data field. The scoring module 126 may determine a single response probability for the user or a response probability for the user for each data field. The probability of getting a response may be based on a machine learning model. A machine learning algorithm observes patterns in data and adjusts its own behavior in order to improve its own performance. Stated in another way, a machine learning algorithm improves its functionality based on what it experienced in the past. In some embodiments, the probability of getting a response from a user for a data field is based on the user's historical response rate. For example, a user may respond to inquiries 30% of the time. The historical response rate may be a general response rate or specific to certain categories of information. For example, a user may be more likely to provide information about their interests than their work history. In some embodiments, the probability of getting a response for a data field is based on a user's connection's historical rate. In some embodiments, the probability of getting a response from a user is based on the likelihood that the user will complete a series of phrases. In some cases, it may be more effective to obtain the information for a data field by presenting the user with a series of phrases to complete. For example, a user may be more inclined to complete the phrase my "My favorite actor is" after completing the phrase "My favorite movie is."

In some embodiments, the data acquisition score for a data field is determined based on the value of the information and the probability of getting a response from the user. The data acquisition score for a data field may be the product of the value of the information associated with the data field and the probability of getting a response from the user.

In some embodiments, the score of a data field is decayed based on a decay rate associated with the data field. For example, the score for the user's interests may decay faster than the score for the user's education background since a user's interests are more likely to change than the user's educational background.

The selection module 124 selects one or more incomplete phrases based on the scores generated by the scoring module 126 and generates a composer interface having the selected one or more completed phrases. In particular, the selection module 124 retrieves one or more value pairs for the user, selects one or more incomplete phrases based on the value pairs, and generates a composer interface with the one or more selected incomplete phrases. As discussed above, a value pair includes information identifying a data field and its corresponding score. In some embodiments, the scoring module 126 sends the selection module 124 a predefined number of the value pairs having the highest scores or value pairs having scores above a predefined threshold. The selection module 124 selects one or more incomplete phrases from the phrase database 226 based on the received value pairs for the data fields. More specifically, the selection module 124 may select the value pair from a plurality of value pairs that have the highest associated score and select one or more phrases associated with the data field of the selected value pair. For example, the selection module 124 may select one or more phrases that are designed to obtain information about the user's favorite books when the data field for storing information about the user's favorite books has the highest score. As discussed above, the phrases stored in the phrase database 226 are associated with data fields.

The selection module 124 generates a composer interface having textual content from the selected phrases and input fields corresponding to the incomplete portions of the phrases. The position of the input fields corresponds to the incomplete portions of the incomplete phrases. For example, if an incomplete phrase for the composer interface is "I typically go the gym _____ times a month," the composer interface may include an input field between the words "gym" and "times."

In some embodiments, the selection module 124 includes an input restriction information with one or more the input fields. As discussed above, the incomplete phrases are associated with input restriction information for the incomplete portions of the phrases. The input restriction information for an input field specifies the type of information the input field may accept as valid input. In some embodiments, an input field may only accept certain category of words. For example, an input field may only accept nouns, verbs, adverbs, adverbs, or adjectives. In some embodiments, an input field may only accept numbers. Using the previous example, the input field between the words "gym" and "times" may only accept input that comprises a number or text corresponding to a number. In some embodiments, an input field may accept a name or property of objects maintained by the social networking system. For example, an input field may only accept names of people, places, things, or concepts. This way, the input to an input field may be restricted to certain categories of information maintained by the social networking system.

In some embodiments, the composer interface includes a description of the input restriction for each input field. The descriptions help signal to the user what types of input they can provide to the input fields. The descriptions are displayed to a user when the composer interface is presented to the user.

In some embodiments, the selection module 124 generates a series of composer interfaces to be provided to the user, where each composer interface includes one or more of the selected phrases. The series of composer interfaces may be configured obtain a certain category of information from the user. For example, each composer interface in the series may prompt the user to fill out a phrase about the user's connections. The composer interfaces in the series may be displayed in a sequence. For example, the second composer interface in the series may be displayed after the user finishes providing input to the first composer interface in the series.

The data acquisition module 122 determines how, where, and when to obtain a user's information. More specifically, the data acquisition module 122 determines, how, where, and when to display the one or more generated composer interface to the user. The data acquisition module 122 may provide a composer interface to the user's device when the user is viewing a page from the social networking system. In some embodiments, the data acquisition module 122 includes a composer interface in the user's newsfeed as a news story. In some embodiments, the composer interface is displayed to the user in response to an action by the user with respect to a news story. For example, the composer interface may be displayed when the user comments on, shares, dismisses or hides, or likes a news story. A user may "like" a news story by selecting a button or graphical user interface element associated with the story. The composer interface may be provided to the user when the user views pages from a third-party website or external system. In particular, the data acquisition module 122 may respond to requests from widgets embedded in third party web pages for composer interfaces.

In some embodiments, the data acquisition module 122 provides a composer interface to the user in response to action or activity of a connection of the user. When a connection of the user completes the phrase of a composer interface, the user may be prompted to add the same information to the user's profile. For example, if a connection of the user completes a phrase, "The best dish at restaurant _____ is _____," the user may be prompted have the completed phrase added to their own profile. The news story describing the connection's activity may include a link that allows the user to add information related to the connection's activity to their profile.

In some embodiments, the data acquisition module 122 includes a composer interface in an advertisement, in the user's profile page, in a third-party application, in an interface for inputting a status message, or in an interface for uploading content such as photos and videos. In some embodiments, a composer interface may be displayed along with social networking content such as photos, videos, news stories, suggestions, status messages, links posted by users, group pages, event pages, pages for public figures, pages for organizations, and any other content provided by or accessible via the social networking system. In some embodiments, the social networking content and advertisements are selected in a way that optimizes a goal discussed above. For each social networking content item and advertisement, the social networking system may maintain a value or score for each goal. Scoring and selecting social networking content items and advertisements in a way that optimizes a goal of a social networking system is discussed further in U.S. patent application Ser. No. 12/645,481, entitled "Selection and Presentation of Related Social Networking System Content and Advertisements," filed on Dec. 22, 2009, which is hereby incorporated by reference in its entirety.

In some embodiments, the data acquisition module 122 provides a composer interface to the user in response to an action or activity by the user that occurs on or off the social networking system. Stated in another way, the composer interface may be displayed to a user in response to the user performing an activity that causes an edge object in the social graph to be updated or created. The composer interface may be displayed to the user when the users checks in to a restaurant, posts a status message updated, sends a message to another user, plays a song, plays a video, plays a game, views a profile, and the like. For example, when the user checks into a restaurant, the user may be presented with a composer interface that prompts the user to complete a phrase about what food they typically order at that restaurant. In this case, the selection module 124 selects phrases that are designed to obtain information relating to the user's dining preferences.

In some embodiments, the data acquisition module 122 provides the user with a composer interface that prompts the user to complete a phrase about one or more of the user's friends or connections in the social networking system. For example, the composer interface may prompt the user to complete one or more phrases about where the user's friend's education history. This way, the social networking system may use the composer interfaces to obtain information about the user's friends.

In some embodiments, the data acquisition module 122 includes one or more completed phrases from connections of the user in a composer interface. The one or more completed phrases are completed versions of the one or more incomplete phrases in the composer interface. This way, the user can see how their friends completed to the one or more incomplete phrases in the composer interface. The completed phrases may be displayed before the user enters input into the composer interface in order to encourage the user to complete the one or more incomplete phrases in the composer interface. The completed phrases may be displayed after the user completes the one or more incomplete phrases in the composer interface in order not to influence the results.

In some embodiments, the data acquisition module 122 sends the composer interface to a user device or an external system. A third party website may insert a set of instructions into one of its web pages that executes when the web page is viewed by a user. The set of instructions causes a frame to be created within the web page that contains content pulled directly from the social networking system (e.g., an iframe). The set of instructions is discussed further in U.S. patent application Ser. No. 12/764,928, entitled, "Personalizing a Web Page Outside of a Social Networking System with Content from the Social Networking System," filed on Apr. 21, 2010, which is hereby incorporated by reference in its entirety.

In some embodiments, the data acquisition module 122 sends a notification to a user's device containing the composer interface. In some embodiments, the notification is pushed to the user's device. In some embodiments, the notification is displayed to the user when the user views a page provided by the social networking system or an external system.

In some embodiments, the data acquisition module 122 provides the user with a feedback questionnaire after the user completes input to a composer interface. The user may complete input to a composer by select a graphical user interface element (e.g., a submit button). The feedback questionnaire asks the user to rate or comment on the composer interface including the one or more incomplete phrases in the composer interface.

In some embodiments, the data acquisition module 122 enables a user to choose which phrases they want to complete. The data acquisition module 122 may provide the user with a list of selectable options that correspond to incomplete phrases. The options may include a description of an incomplete phrase, a description of the type of information the incomplete phrase is trying to collect, the text of the incomplete phrase, an example of a completed version of the incomplete phrase, or any combination thereof. This enables the user to select which incomplete phrase they would like to complete.

The data acquisition module 122 may send a composer interface to a user device via one or more communication channels. The communication channels may comprise one or more different information delivery methods, comprising a stream, a feed, a wall post, an email communication, a comment on a posted content item, a mobile application, a note, a third-party application, a text message, an iframe, a third-party website, a toolbar plug-in, a dashboard, a notification, an advertising communication channel, a discussion board, or any other communication channel that exists or is associated with the social networking service. A discussion board may reside on many different types of objects, such as an event, a group, a fan page, and a photo album, just to name a few. Communication channels are discussed further in U.S. patent application Ser. No. 12/253,149, filed on Oct. 16, 2008, which is hereby incorporated by reference in its entirety.

The object suggestion module 129 helps a user provide structured data to the input fields of the composer interface. More specifically, the object suggestion module 129 receives input entered by a user into a respective input field of the composer interface, identifies graph objects based on the received input and provides the user with a list of selectable options that correspond to the identified graph objects. For example, if the user enters "star," the object suggestion module 129 may identify objects matching "star" or objects having the prefix of "star" such as Starbucks, Star Trek or Star Search. The identified objects do not need to have the input as a prefix and may be related to the input. For example, when the user enters "star," the object suggestion module 129 may provide the suggestion of coffee or telescopes. The list of selectable options may be presented to the user as the user provides input to the composer interface. For example, after the user types, "sta", the object suggestion module 129 may provide the user with a list of objects corresponding to the graph objects of "star," "Starbucks", and "Star Trek." In some embodiments, the list of selectable options are filtered based on the restrictions for the input field the user is providing input to. For example, if the user enters the input "star" into an input field and the input field only accepts names of coffee brands, the object suggestion module 129 presents the user a selectable option corresponding to "Starbucks." In this example, the object suggestion module 129 does not present the user with the selectable option of "Star Trek."

The response module 128 receives and stores the structured data entered by the user into the input fields of the composer interface. More specifically, the response module 128 receives the user's input, identifies data fields in the user's profile associated with the input fields of the composer interface, and stores information that is based on the user's input. The structured data may include information identifying one or more data fields associated with a user. In some embodiments, the response module 128 receives input from a third party application that entered input into the composer interface on the user's behalf. As discussed above, the API server 224 enables third party applications to enter user data into a composer interface on behalf of the user.

Process

Figure 4:
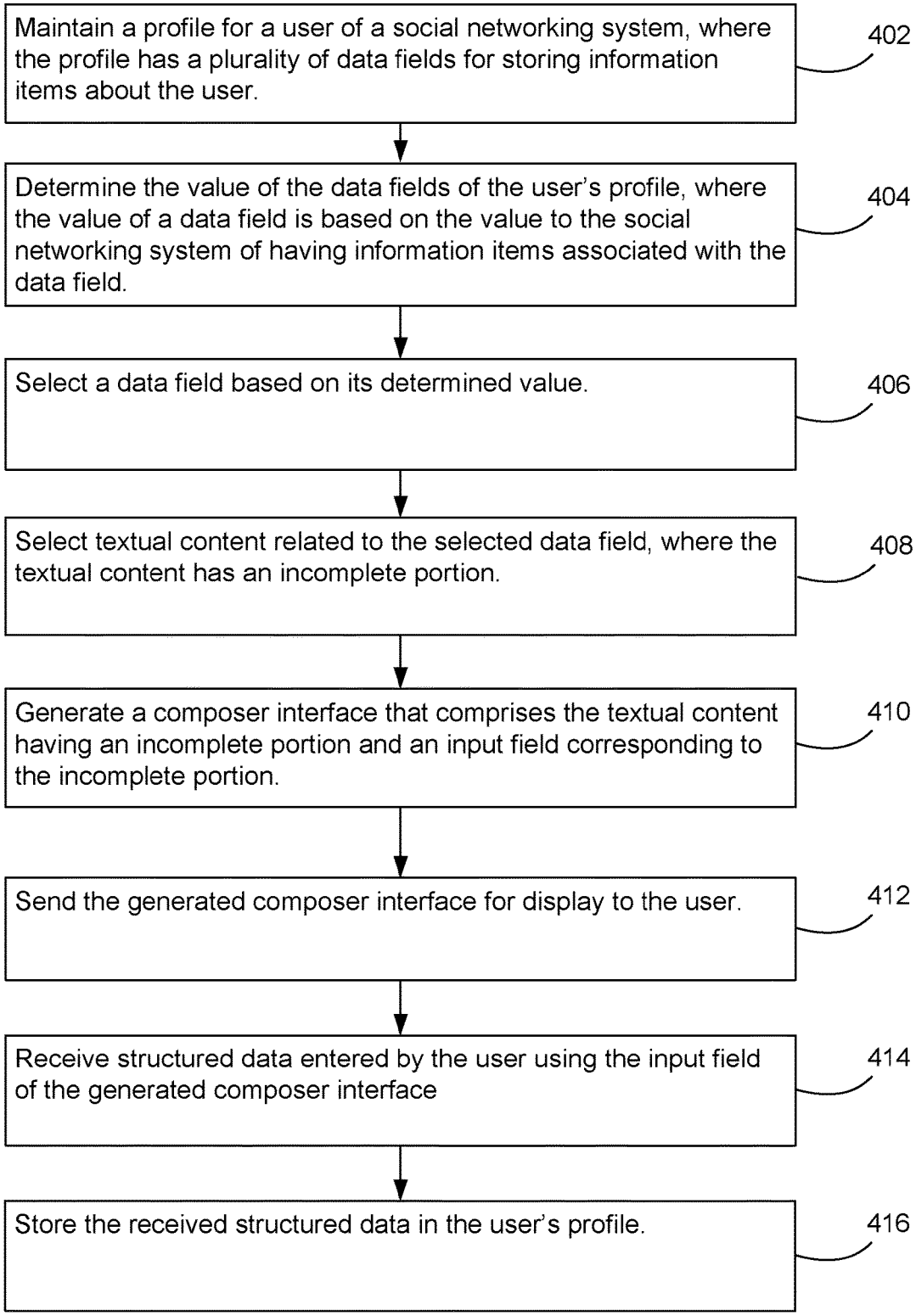
FIG. 4 is a flow chart illustrating a process for acquiring structured user data via a composer interface having textual content with incomplete portions and input fields corresponding to the incomplete portions, in accordance with some embodiments.

FIG. 4 is a flow chart of a process 400 for providing a composer interface having input fields for receiving information that a social networking system wants from a user, in accordance with one embodiment. The process 400 is performed at a server system (e.g., social networking system 100) having one or more processors and non-transitory memory. The non-transitory memory stores one or more programs to be executed by the one or more processors. The one or more programs include instructions for process 400.

In this process 400, a user profile for a user of a social networking system is maintained 402. The user profile has a plurality of data fields for storing information items about the user. At least one of the data fields is associated with an information item about the user. The information items may correspond to or include information from profile objects, edge objects, and content objects.

The value of the data fields of the user profile are determined 404. In some embodiments, the value of a data field is based on the value to the social networking system of having information items associated with the data field. In some embodiments, the value of the information item associated with a data field is based on projected revenue from using the information item. The social networking system may generate revenue from the information item by using the information item in a sponsored story or using the information item to determine which advertisements to display to the user. In some embodiments, the value of the information item associated with a data field is based on a projected increase in user engagement from using the information item. The information item may be used to create personalized content for the user or to select content to display to the user that the user is likely interested in. In some embodiments, the value of the information item associated with a data field is based on the cost of displacing social content. In order to obtain the information item associated with a data field, the social networking system displays a composer interface which displaces other content. The cost of the displaced content may be taken into account with the value of the information item. When the displaced content is an advertisement, the cost of the displaced content may correspond to the revenue lost from not displaying the advertisement. When the displaced content is social content, the cost of the displaced content may corresponds to projected loss in user engagement.

In some embodiments, the data acquisition module 122 selects a set of candidate data fields from the user's profile and determines a score for each of the candidate data fields. The candidate data fields may be data fields that are not associated with an information item for the user or have out of date information about the user.

In some embodiments, the data acquisition module 122 determines a score for each candidate data field in the set of candidate data fields based on a function evaluating a value to the social networking system of having an information item of the candidate data field. In some embodiments, the score for a candidate data field is based at least in part on the value to the social networking system of the information item associated with the data field. In some embodiments, the score for a candidate data field is based at least in part on a probability of getting a response from the user. The probability of getting a response from the user may be based on a historical response rate for the user. The probability of getting a response from the user may be based on a historical response rate for connections of the user.

A data field is selected 406 based on the determined value of having an information item for the user associated with the selected data field. In some embodiments, the data field associated with the highest value is selected. In some embodiments, a predefined number of data fields having the highest associated values are selected. In some embodiments, data fields having an associated value above a threshold value are selected.

In some embodiments, the data field is selected from a set of candidate data fields that each has an associated score. As discussed above, the candidate data fields may be data fields that have missing or out of date information. The score for a data field may be based on the value of the information item associated with the data field and the probability of getting a response from the user. The data field may be selected from the set of candidate data fields based on the scores associated with each of the candidate data fields. Stated in another way, the selected data field may be selected based on its associated score.

Textual content related to the selected data field is selected 408. The textual content has an incomplete portion. Stated in another way, one or more incomplete phrases related to the selected data field are selected. The incomplete phrases are designed to obtain information from the user related to the type of information stored by the selected data field. As discussed above, each incomplete phrase maintained by the social networking system is associated with one or more user profile data fields.

A composer interface is generated 410 that comprises textual content having an incomplete portion and an input field corresponding to the incomplete portion. The textual content may be an incomplete phrase and the input field corresponds to the incomplete portion of the incomplete phrase. In some embodiments, the composer interface includes multiple incomplete phrases and multiple input fields. The textual content of the incomplete phrase is related to the type of information the selected data field stores. For example, if the selected data field stores information about the user's educational history, the textual content of the incomplete phrase may be an incomplete phrase about what the user studied in college. In some embodiments, the input field may only accept certain categories of words. For example, an input field may restrict input to nouns, verbs, adverbs, or adjectives. In some embodiments, the input field may only accept certain categories of information. For example, the input field may only accept names of people, places, or things. By entering a valid input into the input field the user completes the incomplete phrase and provides at least a portion of an information item to the social networking system.

The generated composer interface is sent 412 for display to the user. In some embodiments, the composer interface is sent to the user in a news story and displayed in the user's newsfeed. In some embodiments, the generated composer interface is sent to the user in response to an action by the user with respect to a news story. As discussed above, the composer interface may be provided to the user when the user comments on, shares, dismisses or hides, or likes a news story.

In some embodiments, input entered by the user into the input field of the generated composer interface is received. For example, the user's input may be sent to the social networking system as the user enters each character of the input. Graph objects are identified based on the received input and a list of selectable options corresponding to the identified objects is sent to the user. A user selection of an option from the list of options may be received and structured data for the graph object corresponding to the selected option is entered into the input field.

Structured data entered by the user using the input field of the generated composer interface is received 414. The structured data may be received from a user device or a third party website. In some embodiments, the received structured data includes information identifying the selected candidate data field or one or more data fields in the user's profile.

The received structured data is stored 416 in the user's profile. In some embodiments, an information item associated with the selected candidate data field is determined based on the received structured data. The received structured data may be added to an existing item or a new information item may be generated. The determined information item associated with the selected data field is stored in the profile for the user.

Composer Interface Example

Figure 5:
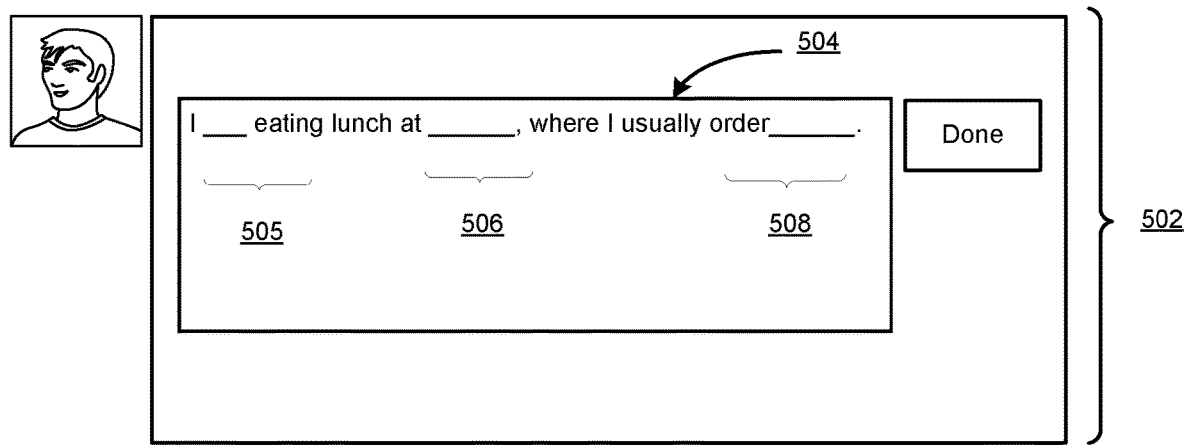
FIG. 5 is an example of a composer interface, in accordance with some embodiments.

FIG. 5 shows an example of a composer interface 502 that may be displayed to a user. The composer interface 503 includes a phrase 504 with incomplete portions and input fields 505, 506 and 508 that correspond to the incomplete portions. In the example of FIG. 5, input field 505 accepts adjectives, input field 506 accepts names of restaurants, and input field 508 accepts nouns or names of food. In some embodiments, the composer interface 502 indicates the type of input each field accepts. For example, text may be displayed under input field 506 indicating that the field accepts restaurant names.

SUMMARY

The foregoing description of the embodiments of the invention has been presented for the purpose of illustration; it is not intended to be exhaustive or to limit the systems and methods to the precise forms disclosed. Persons skilled in the relevant art can appreciate that many modifications and variations are possible in light of the above disclosure.

Some portions of this description describe the embodiments of the systems and methods in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the systems and methods may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the systems and methods may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the systems and methods systems and methods be limited not by this detailed description, but rather by any claims that issue on an application based hereon. Accordingly, the disclosure of the embodiments of the systems and methods are intended to be illustrative, but not limiting, of the scope of the invention, which is set forth in the following claims.

What is claimed is:

1. A method comprising:

maintaining a profile for a user of a social networking system, the profile including a plurality of data fields, one or more of the plurality of data fields being associated with one or more information items, each information item associated with a timestamp indicating when the information item was received;

selecting a set of candidate data fields from the plurality of data fields;

for each candidate data field of the set of candidate data fields, determining a value to the social networking system of receiving an updated information item associated with the candidate data field by determining a freshness score for an information item associated with the candidate data field based on the timestamp indicating when the information item associated with the candidate data field was received and a decay rate that is dependent on a type corresponding to the information item associated with the candidate data field, with different types of information items having different decay rates, so the freshness score decreases over time based on the decay rate;

selecting a candidate data field from the set of candidate data fields based on the determined values;

selecting, by the social networking system, a phrase related to the selected candidate data field, the phrase having a missing portion to be filled in by the user with structured data about the user to complete the phrase, the phrase designed to solicit the information item associated with the selected candidate data field;

generating, by the social networking system, a composer interface that comprises the phrase having the missing portion and an input field corresponding to the missing portion of the phrase, the input field for receiving the structured data from the user providing the information item;

in response to the social networking system receiving a specific user action with content presented by the social networking system, providing for display to the user the generated composer interface as a news story in a newsfeed the social networking system generates for the user;

receiving the structured data entered by the user using the input field of the generated composer interface;

determining the information item associated with the selected candidate data field based on the received structured data; and storing the determined information item with the selected candidate data field in the profile for the user.

2. The method of claim 1, further comprising:

determining whether the information item has expired based on the timestamp associated with the information item and an expiration time period associated with the candidate data field, the expiration time period being a length of time after which the information item expires.

3. The method of claim 2, wherein the candidate data field and another candidate data field of the set of candidate data fields have expiration time periods of different lengths, the information item and an information item of the other candidate data field having different types.

4. The method of claim 1, wherein the specific user action is the user engaging with a content item.

5. The method of claim 1, wherein the specific user action is a connection of the user completing the phrase in an analogous composer interface.

6. The method of claim 1, wherein the specific user action is a connection of the user posting content to the social networking system.

7. The method of claim 1, further comprising:

receiving input entered by the user into the input field of the generated composer interface;

identifying one or more graph objects represented as nodes in a social graph based on the received input, the social graph recording interactions between users and objects as edges connecting nodes in the social graph; and presenting a list of selectable options corresponding to the one or more identified graph objects to the user that the user can select as the input for the input field.

8. The method of claim 1, further comprising:

serving, within the social networking system, content to the user based on the determined information item, where the content is selected based on information gained by the social networking system about the user in the determined information item.

9. The method of claim 1, further comprising:

determining a score for each candidate data field in the set of candidate data fields based on a function evaluating the determined value to the social networking system of having an information item of the candidate data field for the user.

10. The method of claim 9, wherein the selected candidate data field is selected based on the determined score of the selected candidate data field.

11. The method of claim 9, wherein the score for each candidate data field is based in part on a probability of getting a response containing the structured data from the user.

12. The method of claim 11, wherein the probability of getting the response from the user is based on a historical response rate for the user.

13. The method of claim 11, wherein the probability of getting the response from the user is based on a historical response rate for connections of the user.

14. A non-transitory computer-readable memory comprising instructions that when executed by a processor cause the processor to perform steps comprising:

maintaining a profile for a user of a social networking system, the profile including a plurality of data fields, one or more of the plurality of data fields being associated with one or more information items, each information item associated with a timestamp indicating when the information item was received;

selecting a set of candidate data fields from the plurality of data fields;

for each candidate data field of the set of candidate data fields, determining a value to the social networking system of receiving an updated information item associated with the candidate data field by determining a freshness score for an information item associated with the candidate data field based on the timestamp indicating when the information item associated with the candidate data field was received and a decay rate that is dependent on a type corresponding to the information item associated with the candidate data field, with different types of information items having different decay rates, so the freshness score decreases over time based on the decay rate;

selecting a candidate data field from the set of candidate data fields based on the determined values;

selecting, by the social networking system, a phrase related to the selected candidate data field, the phrase having a missing portion to be filled in by the user with structured data about the user to complete the phrase, the phrase designed to solicit the information item associated with the selected candidate data field;

generating, by the social networking system, a composer interface that comprises the phrase having the missing portion and an input field corresponding to the missing portion of the phrase, the input field for receiving the structured data from the user providing the information item;

in response to the social networking system receiving a specific user action with content presented by the social networking system, providing for display to the user the generated composer interface as a news story in a newsfeed the social networking system generates for the user;

receiving the structured data entered by the user using the input field of the generated composer interface;

determining the information item associated with the selected candidate data field based on the received structured data; and storing the determined information item with the selected candidate data field in the profile for the user.

15. The non-transitory computer-readable memory of claim 14, wherein the steps further comprise:

determining whether the information item has expired based on the timestamp associated with the information item and an expiration time period associated with the candidate data field, the expiration time period being a length of time after which the information item expires.

16. The non-transitory computer-readable memory of claim 15, wherein the candidate data field and another candidate data field of the set of candidate data fields have expiration time periods of different lengths, the information item and an information item of the other candidate data field having different types.

* * * * *